3,461,468
MODIFIED POLYESTERS HAVING IMPROVED
DYELIGHTFASTNESS
Herbert S. Morgan, Jr., Apex, and Carl J. Setzer, Jr., Durham, N.C., assignors to Monsanto Company, St. Louis, Mo., a corporation of Delaware
No Drawing. Filed Feb. 15, 1965, Ser. No. 432,835
Int. Cl. D06p 3/00
U.S. Cl. 8—165          4 Claims

ABSTRACT OF THE DISCLOSURE

The dyelightfastness of polyester filaments modified with alkoxy polyalkylene glycols and polyhydroxy aliphatic compounds is improved by subjecting a previously dyed filament to a temperature between 130° C. and 175° C. for between 5 and 25 minutes.

---

Polyesters possess many properties which make them useful as articles of commerce, especially in the forms of fibers and films. However, due to the chemical inertness of the polymer, articles manufactured from polyesters have suffered from the disadvantage of poor dyeability. There have been a number of methods advanced to overcome this poor receptivity for dyestuffs found in polyesters. One method which gave great improvements in the receptivity for dyestuffs were the inclusion of small amounts of certain agents in the polymer-forming reaction to produce a modified polyester. Although the advantages realized by the introduction of these modified agents were substantial, it was found that the dyed polyester composition had a poor dyelightfastness. Hence, because of the great value, particularly in the textile field, of polyesters in general, a solution to the dyelightfastness problem which they pose has been greatly desired.

Accordingly, it is an object of this invention to provide polyester compositions which exhibit good dyelightfastness.

It is another object of this invention to provide filaments, fibers and yarns from polyester compositions which exhibit good dyelightfastness.

It is a further object of this invention to provide polyester filaments, fiber, and yarns which exhibit good dyelightfastness without loss in any of their beneficial properties.

Other objects and advantages of this invention will become apparent from the following detailed description of the invention.

These and other objects are accomplished in general by dyeing modified polyester-type filaments and there after heating these filaments to a temperature in the range of from about 130 to 175° C., and preferably from about 140 to 150° C. for a period of from about 5 to 25 minutes and preferably for about 20 minutes. It is important that the filaments be heated subsequent to the dyeing step, inasmuch as it has been found that carrying out the heating step prior to the dyeing step adversely effects the receptivity for the dyestuff. Furthermore, it has been found that superior results are obtainable when the dyed filaments are subjected to the afore-noted treatment.

The synthetic condensation polymers, which have been found to be uniquely amenable to the beneficial results attainable in the practice of this invention, are as has been already indicated modified polyesters. The nature of these polymers and the methods by which they are produced are fully described in U.S. Patent 2,895,946 to Huffman. In brief, they differ from conventional polyester polymers in that small amounts of modifying agents are employed in their production in addition to the standard polyester-forming reactants, i.e., a dibasic acid, such as terephthalic acid, isophthalic acid or the esters thereof, and a polymethylene glycol, such as ethylene glycol.

Broadly speaking, the modified agents employed to produce these modified polyesters are of the type which are known in the art as chain terminators and cross-linking agents. The particular combination of chain terminators and cross-linking compounds employed in the production of the polymers with which this invention is concerned have been found to be extremely effective in the enhancement of polymer receptivity for dyestuffs.

Specifically, the chain terminating agents which are used in preparing the modified polymers suitable for use with the invention are monohydric polyalkylene oxides having the general formula;

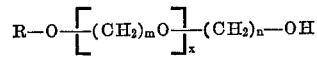

wherein R is an alkyl group containing 1 to 4 carbon atoms, m and n are integers from 1 to 4, and x is an integer in the range from 1 to 100 or greater. Examples of such substances are methoxypolyethylene glycol, ethoxypolyethylene glycol, propoxypolyethylene glycol, butoxypolyethylene glycol, methoxypolypropylene glycol, methoxypolymethylene glycol and the like. Methoxypolyethylene glycol is especially suitable.

Materials suitable as chain-branching agents or cross-linking agents, which are employed to increase the viscosity or molecular weight of the polyesters under consideration are the polyols which have a functionality greater than two and which are of the general formula:

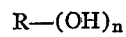

wherein R is a saturated aliphatic hydrocarbon radical containing from 3 to 6 carbon atoms and $n$ is an integer of from 3 to 6. Suitable examples of such compounds are glycol, sorbitol and pentaerythritol, with pentaerythritol being particularly preferred.

In preparing the modified polyesters described above, the noted chain terminating agents are employed in amounts ranging from about 0.05 mol percent to 4.0 mol percent based on the amount of dicarboxylic acid or dialkyl ester thereof employed in the polymer-forming reaction. The chain-branching or cross-linking agents are employed in amounts ranging from 0.05 mol percent to 2.4 mol percent, based in the amount of dicarboxylic acid or dialkyl ester thereof employed in the polymerization reaction. The preferred range of chain-branching agent is from 0.1 to 1.0 mol percent.

It is significant to note that the modified polyesters as described herein can be produced without any significant change in the reaction conditions normally employed in making unmodified polyethylene terephthalate. Thus, to illustrate, the calculated amounts of modifying agents together with the dibasic acid or ester thereof and the polymethylene glycol of choice are charged to a reaction vessel. The first step or stage of the reaction is carried at atmospheric pressure and at a temperature in the range of 90° C. to 250° C. and preferably between 150° C. and 220° C. When from 0.001 to 1.0 percent by weight, based on the weight of the dicarboxylic acid or ester thereof, of a suitable esterification catalyst is employed, the reaction may be carried out at pressures above or below atmospheric. Alcohol is evolved which is continuously removed by distillation. At the completion of the first stage, the excess glycol, if any, is distilled off prior to entering the second stage of the reaction.

In the second or polymerization stage, the reaction is conducted at reduced pressure and preferably in the presence of an inert gas, such as nitrogen, in order to prevent oxidation. This can be accomplished by maintaining a nitrogen blanket over the reactants. For optimum results, a pressure within the range of less than 1 mm. up to 5 mm. of mercury is employed. This reduced pressure is necessary to remove the free ethylene glycol that is formed during this stage of reaction, the ethylene glycol being volatilized under these conditions and removed from the system. The polymerization step is conducted at a temperature in the range of 220° C. to 300° C.

The afore-noted modified polyesters have been described in detail, inasmuch as the fibers obtained therefrom appear to have some particular properties which enable them to respond to the treating method of this invention. That is, it has been found that fibers which have been prepared from polyethylene terephthalate per se or polyethylene terephthalate modified in a different manner do not acquire an improved dyelight-fastness when treating in accordance with this invention.

As has been noted, the heat treatment is conducted after the filaments have been subjected to a dyeing operation. Normally, the dyestuff is applied to the filament in the form of an aqueous solution or dispersion in the presence of carrier agents. Although the treatment of this invention relates to any dyed polyester of the type discussed above, polyesters are generally dyed with the disperse class of dyes such as Latyl Yellow 3G (Disperse Yellow 54), Latyl Yellow 4RL (Disperse Yellow 23, C.I. 26070), Latyl Cerise N (Disperse Red 60), Latyl Red B (Disperse Violet 17), Latyl Brilliant Blue 2G (Disperse Blue 61), Cibacete Brilliant Blue BG New (Disperse Blue 3, C.I. 61505), Eastone Brown 2R (Disperse Orange 5, C.I. 11100), Eastman Blue BNN (Disperse Blue 3, C.I. 61505), Celanthrene Fast Yellow GL (Disperse Yellow 2), Celliton Fast Blue AF (Disperse Blue 9, C.I. 61115), and the like.

Heating of the filaments may be affected in any convenient manner, for example, by means of hot liquids; cycling a hot inert gas, such as air, nitrogen or carbon dioxide; a battery of infra-red heating lamps; passage between H. F. electrodes or by contact with a hot metal surface which may be heated by any known means, such as hot fluids, electrical heating elements or electrical conduction. As will be readily realized, the optimum heating time will depend on such factors as temperature employed, heating efficiency, and the like. However, generally speaking, the fiber exposure time will vary from about 10 to 25 minutes. In most instances, preferable results will be attainable at a heating time of about 20 minutes.

To further illustrate the present invention and its advantages thereof, the following specific examples are given, it being understood that these are merely intended to be illustrative and not limitative. Unless otherwise indicated, all parts and percents are by weight.

Example 1

In this example, commercial, unmodified polyethylene terephthalate fiber was dyed with Latyl Red B dyestuff (Disperse Violet 17) using conventional disperse dyeing techniques to 0.5 percent by weight dye pickup without the use of carriers.

Example 2

Example 1 was repeated and the dyed fiber obtained was heated in an air circulation oven for 20 minutes at a temperature of 145° C.

Example 3

A polyester autoclave reactor was charged with about 250 parts by weight of dimethyl terephthalate, about 300 parts by weight of ethylene glycol, about 15 parts by weight of methoxy polyethylene glycol having a molecular weight of about 2000, about 0.25 part by weight of pentaerythritol, about 0.16 part by weight of zinc acetylacetonate catalyst and about 0.13 percent by weight of a phosphite-polyphosphonate heat stabilizer. Ester interchange was carried out by heating the reactants to about 175–180° C. and removing the methanol distillate as it formed. The excess ethylene glycol was removed by increasing the reaction temperature to about 280° C. 18.7 ml. of ethylene glycol slurry containing about 28.6 percent by weight titanium dioxide was added to the reaction at a temperature maintained at about 280° C. under a vacuum of less than 1 mm. of mercury to carry out the polymerization step. The polymerization was continued until the degree of polymerization desired was obtained. Fibers were prepared from this polymer using conventional techniques. The fiber was dyed with Latyl Red B dyestuff (Disperse Violet 17) using standard disperse dyeing techniques but without the use of carriers to 0.5 percent by weight dye pickup.

Example 4

Example 3 was repeated and the dyed fiber obtained was heated in an oven for 20 minutes at a temperature of 145° C.

Each of the dyed fibers prepared in the preceding examples were tested for dyelightfastness and the results are shown in the following table.

| Example | 20 SFH | 40 SFH | 60 SFH | 80 SFH |
|---|---|---|---|---|
| 1 | 5 | 5 | 5 | 5 |
| 2 | 5 | 4–5 | 4 | 4 |
| 3 | 3–4 | 2–3 | 2 | 1–2 |
| 4 | 4 | 3–4 | 3 | 2–3 |

The results given for each example are expressed as the degree of change for the dye used in the test. The degree of alteration of shade of the exposed fibers was determined on a subjective visual scale as follows:

5—Negligible or no change
4—Slightly changed
3—Noticeable changed
2—Considerably changed
1—Markedly changed A value of about 3.0 or greater after exposure of 40 Standard Fade-O-Meter hours (SFH) is desirable for commercialization.

As many variations within the spirit and scope of this invention will occur to those skilled in the art, it is to be understood that the invention is not limited to the specific embodiments thereof except as set forth in the appended claims.

We claim:
1. In a process for producing dyed filaments derived from a modified polyester obtained by reacting together at least one compound selected from the group consisting of terephthalic acid, isophthalic acid and dimethyl esters of said acids, and at least 1 polymethylene glycol containing from 2 to 10 carbon atoms, with from about 0.05 to 4.0 mol percent, based on the weight of the first named compound, of a compound selected from the group consisting of monohydric polyalkylene oxides having the formula

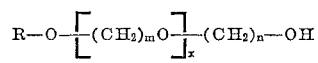

wherein R is selected from the group consisting of alkyl groups containing from 1 to 4 carbon atoms, $m$ and $n$ are integers from 1 to 4, and $x$ is an integer in the range of from 1 to 100, and with from 0.05 to 2.4 mole percent, based on the weight of the first named compound, a compound having the general formula

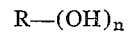

wherein R is a saturated aliphatic hydrocarbon radical containing from 3 to 6 carbon atoms and $n$ is an integer of from 3 to 6, wherein said filaments are dyed by contact with an aqueous dyeing medium and thereafter separated from said medium; the improvement which comprises, improving the dye-lightfastness of said dyed filaments by heating said filaments, after separation from said medium, to a temperature in the range of from about 130° C. to 175° C. for a period of about 5 to 25 minutes.

2. The process of claim 1, wherein said dyed filaments are heated to a temperature of about 145° C. for about 20 minutes.

3. In a process for producing dyed filaments derived from a modified polyester obtained by reacting dimethyl terephthalate and ethylene glycol with from about 0.05 to 4.0 mol percent, based on the weight of the first named compound, of methoxy polyethylene glycol and from about 0.05 to 2.4 mol percent, based on the weight of the first named compound, of pentaerythritol, wherein said filaments are dyed by contact with an aqueous dyeing medium and thereafter separated from said medium; the improvement which comprises, improving the dyelight-fastness of said dyed filaments by heating said filaments, after separation from said medium, to a temperature in the range of from about 130° C. to about 175° C. for a period of about 5 minutes to 25 minutes.

4. The process as in claim 3, wherein said dyed filaments are heated to a temperature of about 145° C. for a period of about 20 minutes.

References Cited

UNITED STATES PATENTS

| | | | |
|---|---|---|---|
| 2,663,612 | 12/1953 | Gibson | 8—55 X |
| 2,895,946 | 7/1959 | Huffman | 260—75 |
| 3,034,847 | 5/1962 | Chapman | 8—4 |
| 3,073,663 | 1/1963 | Rosener. | |

NORMAN G. TORCHIN, Primary Examiner

T. J. HERBERT, Jr., Assistant Examiner

U.S. Cl. X.R.

8—74, 179; 260—75